United States Patent
Leibig et al.

(10) Patent No.: US 11,254,047 B2
(45) Date of Patent: Feb. 22, 2022

(54) THREE-DIMENSIONAL PRINTING CONTROL

(71) Applicant: CHROMATIC 3D MATERIALS, INC., North Golden Valley, MN (US)

(72) Inventors: Cora Leibig, Maple Grove, MN (US); Daniel Gilbert, Richfield, MN (US); Paul Hopkins, Savage, MN (US); Michael Garrod, Minnestrista, MN (US)

(73) Assignee: CHROMATIC 3D MATERIALS, INC., North Golden Valley, MN (US)

( * ) Notice: Subject to any disclaimer, the term of this patent is extended or adjusted under 35 U.S.C. 154(b) by 0 days.

(21) Appl. No.: 16/749,671

(22) Filed: Jan. 22, 2020

(65) Prior Publication Data

US 2020/0230874 A1    Jul. 23, 2020

Related U.S. Application Data

(63) Continuation of application No. 16/256,657, filed on Jan. 24, 2019, now Pat. No. 10,639,842, which is a
(Continued)

(51) Int. Cl.
*B29C 64/118* (2017.01)
*B29C 64/393* (2017.01)
(Continued)

(52) U.S. Cl.
CPC .......... *B29C 64/118* (2017.08); *B29C 64/209* (2017.08); *B29C 64/393* (2017.08);
(Continued)

(58) Field of Classification Search
CPC ..... B29C 64/118; B29C 48/16; B29C 48/335; B29C 48/345; B29C 64/00; B29C 64/10;
(Continued)

(56) References Cited

U.S. PATENT DOCUMENTS

| 6,454,972 B1 | 9/2002 | Morissette et al. |
| 7,747,341 B2 | 6/2010 | Dubois et al. |

(Continued)

FOREIGN PATENT DOCUMENTS

| DE | 19729982 A1 | 1/1999 |
| EP | 2955004 A1 | 12/2015 |

(Continued)

OTHER PUBLICATIONS

PCT/US2018/064323, "International Search Report and Written Opinion received," 23 pages.
(Continued)

*Primary Examiner* — Stella K Yi
(74) *Attorney, Agent, or Firm* — Loza & Loza, LLP; Mark L. Cooper

(57) ABSTRACT

A three-dimensional (3D) object production system and methods for 3D printing reactive components to form a thermoset product. The disclosure relates to Use of a 3D printer having a controller comprising one or more processors to print a 3D object. The disclosure also provides a 3D object production system and methods for 3D printing comprising adjusting one or more parameters of an at least one actuator to produce a 3D object based on a reaction rate between reactive components.

20 Claims, 11 Drawing Sheets

Related U.S. Application Data continuation of application No. PCT/US2018/064323, filed on Dec. 6, 2018.

(60) Provisional application No. 62/595,400, filed on Dec. 6, 2017.

(51) Int. Cl.
| | |
|---|---|
| *B29C 64/209* | (2017.01) |
| *B29K 101/10* | (2006.01) |
| *B33Y 70/00* | (2020.01) |
| *B29K 105/00* | (2006.01) |
| *B33Y 10/00* | (2015.01) |
| *B29C 64/336* | (2017.01) |
| *B29C 64/321* | (2017.01) |

(52) U.S. Cl.
CPC .......... *B29C 64/321* (2017.08); *B29C 64/336* (2017.08); *B29K 2101/10* (2013.01); *B29K 2105/0094* (2013.01); *B33Y 10/00* (2014.12); *B33Y 70/00* (2014.12)

(58) Field of Classification Search
CPC ..... B29C 64/24; B29C 64/124; B29C 64/147; B29C 64/153; B29C 64/165; B29C 64/171; B29C 64/188; B29C 64/194; B29C 64/205; B29C 64/223; B29C 64/232; B29C 64/236; B29C 64/307; B29C 64/393; B29C 48/346
See application file for complete search history.

(56) References Cited

U.S. PATENT DOCUMENTS

| | | | |
|---|---|---|---|
| 8,167,395 | B2 | 5/2012 | Fienup et al. |
| 9,707,717 | B2 | 7/2017 | Sand |
| 2014/0363532 | A1 | 12/2014 | Wolfgram |
| 2015/0174824 | A1 | 6/2015 | Gifford et al. |
| 2015/0352787 | A1 | 12/2015 | Humbert et al. |
| 2017/0028635 | A1* | 2/2017 | Evans .............. B29C 64/393 |
| 2017/0043533 | A1 | 2/2017 | Chang |
| 2017/0043536 | A1 | 2/2017 | Schmehl et al. |
| 2017/0129169 | A1 | 5/2017 | Batchelder et al. |
| 2019/0168446 | A1 | 6/2019 | Leibig et al. |

FOREIGN PATENT DOCUMENTS

| | | |
|---|---|---|
| EP | 3124217 A2 | 2/2017 |
| WO | 2016061060 A1 | 4/2016 |
| WO | 2016085914 A1 | 6/2016 |
| WO | 2016085992 A1 | 6/2016 |
| WO | 2016086216 A1 | 6/2016 |
| WO | 2016191329 A1 | 12/2016 |
| WO | 2017095658 A1 | 6/2017 |

OTHER PUBLICATIONS

Rios, Orlando, et al., "Evaluation of Advanced Polymers for Additive Manufacturing," Oak Ridge National Laboratory, Materials Science and Technology Division Advanced Manufacturing Office, ORNL/TM-2017/509, Crada Final Report/NFE-14-05252, 29 pages.
Office Action (Communication) dated Dec. 23, 2020, by the European Patent Office in corresponding European Patent Application No. 18/886,864.0. (17 pages).
Supplementary European Search Report for EP18 88 6864 dated Jul. 8, 2021.

* cited by examiner

THREE-DIMENSIONAL PRINTING CONTROL

The disclosure herein relates to three-dimensional printing control methods and processes, and further to systems, devices, and apparatus for performing and implementing such methods and processes. The disclosure also relates to using a controller to control a viscosity, a degree of polymerization, and an aspect ratio of a thermoset product and print a 3D object based on control of the viscosity, degree of polymerization, and aspect ratio.

BACKGROUND

Fused filament fabrication (FFF), also referred to in the art as thermoplastic extrusion, plastic jet printing (PJP), fused filament method (FFM), or fusion deposition modeling, is an additive manufacturing process wherein a material is extruded in successive layers onto a platform to form a 3-dimensional product. Typically, FFF uses a melted thermoplastic material that is extruded onto a lower-temperature platform. Three-dimensional printing (3D printing) often uses support structures which are easily dissolved or removed from the part after it is finished.

Disadvantages of existing FFF technology using thermoplastics include single material property printing, limited print-direction strength, limited durability, and limited softness. Thermosetting materials have generally not been used in FFF because prior to cure, the monomers are low viscosity liquids, and upon deposition, the curing liquid flows or breaks into droplets, resulting in finished parts of low quality and undesirably low resolution. In practice, attempts to print with thermoset materials has required addition of fillers (such as inorganic powders or polymers) to induce thixotropic behavior in the resin before it is fully cured. These solutions affect the final properties of the printed part. Other problems include poor resolution control in the printed part and frequent clogging of mixing systems.

SUMMARY

It may be described that the exemplary systems and methods described herein may control, or adjust, various part properties by controlling, or modifying one or more of a plurality of reactive components to provide a thermoset product for use in 3D printing. For example, a proportion of flow from isocyanate sources based on isocyanate attributes may be used to control part flexibility, color, optical refractive index, etc. (for instance, more specifically, smaller molecular weight (Mw) may provide, or give, more rigid materials, higher Mw give more flexible materials).

Further, for example, a proportion of flow from polyol sources based on polyol attributes may be used to control part flexibility, color, optical refractive index, etc. (for instance, more specifically, smaller molecular weight may give, or provide, more rigid materials, higher Mw give more flexible materials). Still further, for example, a proportion of flow from a gas-generation source, such as a blowing agent or reactive species that generates gas may be used to control part porosity or density (e.g., to create a controlled "foam").

It may be described that the exemplary systems and methods may include or utilize various extruded thermoset printing apparatus to monitor/fix various issues, control various parameters, or control environmental conditions when generating or creating 3D objects. For example, the extruded thermoset printing apparatus may be configured to detect obstruction in the print flow tubing/nozzle by detecting torque on the motors (e.g., using torque upper limits to detect viscosities that are out of the operating range), monitoring the flow within the tubing, and/or pressure within the printing apparatus. Detection of an obstruction may trigger change or cleaning of the mixing system. Further, for example, a mixing quality may be detected, or determined (e.g., using metering pumps to ensure the right ratios of materials are being mixed together or chemical analysis), as material exits the printhead, such as by a color detection or chemical detection, which may then be used to delay deposition of material on part, purge material into a purge area until mixing is achieved, and/or warn a user. Still further, for example, the pressure of each resin may be detected, and motor displacement may be controlled as necessary to achieve desired material flow rate or stop flow. In other words, the exemplary systems and methods may use pressure feedback to monitor actual volume flow to compare against calculated volume flow. Still further, for example, flow of the various reactive components or resultant thermoset product may be monitored. More specifically, flow feedback may be used to monitor actual volume flow to compare against calculated volume flow. Still further, for example, weight of the 3D object be printed, or created, may be monitored, and used in various control processes. In other words, the printing apparatus may be configured to detect the weight of the print and that the amount pumping is keeping up with the program desired amount. Further, the amount of material exiting onto the platform may be verified to match the theoretical amount such that, e.g., corrections or adjustments can be made. Still further, for example, pressure may be adapted for container diameter. More specifically, a sensing system may be used to compensate for the gradient of pressure needed across different sized vessels during printing of the reactive materials, and another measuring device would ensure consistent flow.

And still further, for example, the printing apparatus may include a tip wiping mechanism to clean tip to prevent glob formation and drag. More specifically, the tip wipe may have a 'clean' area to wipe the tip of the nozzle clean. Since the polyurethane will cure and harden, there must be a 'clean' area to wipe. Further, the tip wipe may be replaceable.

Yet still further, the printing apparatus may provide, or include, a humidity controlled cabinet to control moisture that leads to part quality. The humidity controlled cabinet may have an internal or external active system to remove moisture. Further, the controlled cabinet may have at least two functions: remove the moisture to help build parts and create a narrower band wide of moisture (which may allow less testing of variables).

Still further, for example, the printing apparatus may provide, or include, a purge container (e.g., a bucket) to put purged material. Material may be purged at the beginning of a part or inside a part to keep the nozzle from locking up with curing materials.

Still further, for example, the printing apparatus may be able to control cabinet temperature. For instance, the cabinet may have sides and ceiling to contain the heated air. The temperature of the internal cabinet will help define the curing time of polyurethane. As the cabinet temperature raises, the polyurethane viscosity may increase, and the cure time may decrease. Also, raising the internal temperature, the environment temperature would be removed or reduced.

It may also be described that the exemplary systems and methods may control, or adjust, various print conditions to provide desired geometry and resulting part-filling of the strand placed on the part. For example, time per layer, flow rate through nozzle, viscosity at nozzle, and cure acceleration may be adjusted, or modified. Further, the temperature of the resin may affect viscosity change out of the nozzle and a faster reaction speed of the material. The conditions from the timing of the viscosity and reaction rate of the material may create a profile of the material which translates to the resulting physical and mechanical properties. Timing of the viscosity and reaction rate can affects the space-filling properties of the material. Proper space-filling can improve mechanical properties and control of the viscosity and flow rate can allow for faster printing without losing part resolution. Still further, for example, the increased temperature of the platform may create a lowering of viscosity and a quicker reaction speed of the material closest to the platform and may create a different viscosity and reactivity for the exiting material, especially for the base layers. Still further, for example, the temperature of the build volume may create a quicker reaction speed and start to speed the overall cure of the finished part. Still further, for example, temperature at the extrusion nozzle may also be able to alter the cure as it is deposited and resulting strand geometry, e.g., for quick reactive cure adjustments. And still further, for example, the humidity of the printing chambers may be used to control, or affect, the formation of bubble defects in a part.

It may also be described that the exemplary systems and methods may control, or adjust, various bead shapes of the thermoset product using nozzle diameter, height of the nozzle from the 3D object being printed, and nozzle tip shape. In general, the smaller the tip (ID) size, the better the part resolution. More specifically, the tip (ID) for the most part may define the maximum/minimum volume rate. In general, if the flow volume is smaller than the tip (ID) the out flow may "walk" between the edges of the tip (ID). If the flow volume creates a cross-section larger than the tip (OD), the material may flow up around the tip, creating a non-flat top surface. Further, the part definition may be defined by the support angle and the resolution of the part. Still further, bead formation may be flattened if desired. In general, the exemplary systems and methods may affect the ability to shape the top of the bead.

It may also be described that the exemplary systems and methods may control, or adjust, various tool path controls. For example, the translation path for each layer may control the flow and resolution of the printed part. At the end of segment/contour, the tip may be moved to the next segment/contour, and the exemplary systems and methods may move to the next position by changed flowing (e.g., reduced or stopped flow). The creation of the toolpath should be such that the start of the next segment/contour should be as close as possible. Further, for example, the exemplary systems and methods may control whether to use a parallel or perpendicular pattern to controls the resulting strength isotropy of the part. Further, stress-strain results may be used to modify the generated toolpath to return the "strongest" or "more flexible' toolpath based on the collected data from the strength tests. Still further, for example, the time per layer may control time to harden previous layer. There will be a "minimum layer time," which may be defined as the minimum amount of time it takes to partially cure or gel a layer of polyurethane of given volume. If the next layer is printed before this minimum time, then the previous layer may deform by the weight of the current layer, and the exemplary systems and methods may adjust head speed in view thereof. And still further, the stoichiometry and/or ratio of reactive components, or specie, may further be used to control part quality. Yet still further, the exemplary systems and methods may be used to control the seams of the 3D object ("seam control"). More specifically, the seams may be reduced by overlapping or hiding the seams on the inside of the 3D object by using different Z, or height, levels at start and stop of a layer or path. Further, the start/end of the toolpath may be a given issue, and the start/end flow may be equal to the constant flow cross-section to, e.g., potentially avoid flaws. The start/end segment can overlap but there may be a change in the volume. A potential seam flaw can be reduced hiding part or all of the start/end segments inside the part. If the seam is internal, then the toolpath may avoid this volume when filling the part, and the seam segment can be moved in Z, or height dimension, to reduce the fill volume (e.g., start lower in z, raise to layer height, then reduce the volume flow over the end segment).

Still further, for example, the exemplary systems and methods may include, or provide, automatic nozzle cleaning to allow cleaning between layers and/or to clean off the buildup on the tip. The automatic cleaning can be timed or would be controlled with smart technology (e.g., recognized by a sensor). Thus, any collected material on the tip may be removed before it becomes fully or near cured. In at least one embodiment, the tip wipe could be made of a material that polyurethane does not stick to. (e.g., Silicone).

Still further, for example, the exemplary systems and methods may include, or provide, speed control including acceleration. More specifically, the controller may have independent control of all axes (X,Y,Z) and may also have control of head volume flow. The control of the volume flow of the resin/polyethene may not be the same as the X,Y,Z axes, and thus, the controller may start the resin/pu flow before/after the start of the X,Y,Z axes movement. Also, the acceleration/de-acceleration may be different for each or all of the axes and may be controlled to create a desired consistent volume flow And still further, for example, the exemplary systems and methods may include, or provide corner speed control to, e.g., control the definition of the corner areas. To create a higher speed print, longer segments (e.g., longer, straighter segments) may have a higher print speed than corners. The controller may control all the axes to create a smooth and consistent volume flow through the corner.

DETAILED DESCRIPTION OF EXEMPLARY EMBODIMENTS

Figure 1:
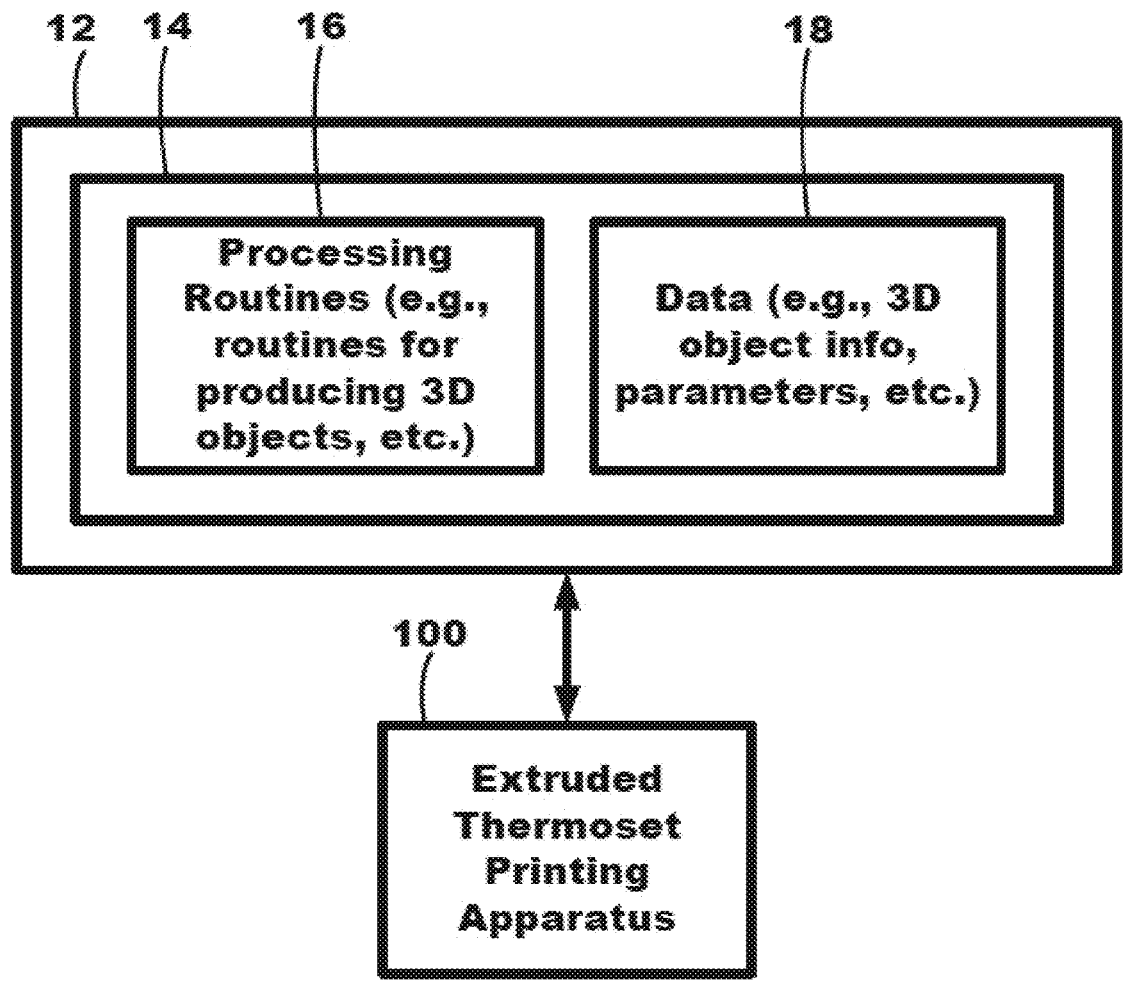
FIG. 1 is a block diagram of an exemplary 3D object production system.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Various examples and embodiments of the inventive subject matter disclosed here are possible and will be apparent to a person of ordinary skill in the art, given the benefit of this disclosure. In this disclosure reference to "some embodiments," "certain embodiments," "certain exemplary embodiments" and similar phrases each means that those embodiments are non-limiting examples of the inventive subject matter, and there may be alternative embodiments which are not excluded.

The articles "a," "an," and "the" are used herein to refer to one or more than one (i.e., to at least one) of the grammatical object of the article. By way of example, "an element" means one element or more than one element.

As used herein, the term "about" means±10% of the noted value. By way of example only, a composition comprising "about 30 wt. %" of a compound could include from 27 wt. % of the compound up to and including 33 wt. % of the compound.

The word "comprising" is used in a manner consistent with its open-ended meaning, that is, to mean that a given product or process can optionally also have additional features or elements beyond those expressly described. It is understood that wherever embodiments are described with the language "comprising," otherwise analogous embodiments described in terms of "consisting of" and/or "consisting essentially of" are also contemplated and within the scope of this disclosure.

As used herein, the terms "thermoset," "thermoset product," and "thermoset material" are used interchangeably and refer to the reaction product of at least two chemicals which form a covalently bonded crosslinked or polymeric network. In contrast to thermoplastics, a thermoset product described herein may irreversibly solidify or set.

As used herein, the term "elastomer" means a polymer (e.g., a polyurethane) that is deformable when stress is applied, but retains its original shape after the stress is removed.

As used herein, the term "layer" refers to a strand of thermoset product that has been extruded from an extrusion nozzle and deposited on, for instance, a substrate. A layer is initially a partially reacted thermoset product, and cures to become a completely reacted thermoset product.

As used herein, the term "partially reacted thermoset product" refers to a covalently bonded crosslinked or polymeric network that is still reactive. For example, it still has hydroxyl, amine, and/or isocyanate functionality that gives a measureable hydroxyl number, NH number, or NCO number in a titration. In another embodiment, a partially reacted thermoset product is a thermoset product that has a viscosity below 3,000,000 cp. In one embodiment, a partially reacted thermoset product is a thermoset product that has a molecular weight of no greater than 100,000 g/mol.

As used herein, the term "completely reacted thermoset product" means a covalently bonded crosslinked or polymeric network that has no measurable reactive groups (e.g., hydroxyl, amine, or isocyanate functionality). In another embodiment, a completely reacted thermoset product is one that is a solid and has no measurable viscosity.

As used herein, the term "environmental parameter" means one or more of temperature, moisture level, and humidity.

In certain embodiments, the three-dimensional (3D) object production system or the three-dimensional (3D) object production method includes a controller comprising one or more processors. In certain embodiments, the three-dimensional (3D) object production system or the three-dimensional (3D) object production method can be operably coupled to an extruded thermoset printing apparatus. In certain embodiments, the three-dimensional (3D) object production system or the three-dimensional (3D) object production method comprises at least one actuator operably coupled to the extrusion nozzle to move the extrusion nozzle when delivering thermoset product to form the 3D object.

In certain embodiments, the controller comprising one or more processors can provide instructions to the extruded thermoset printing apparatus. These instructions can modify the method for printing a 3D object. In certain embodiments, these instructions instruct at least one actuator operably coupled to the extrusion nozzle to move the extrusion nozzle when delivering thermoset product to form the 3D object.

In certain embodiments, the controller can adjust one or more parameters of the at least one actuator to produce the 3D object based on a reaction rate between a first reactive component and a second reactive component to provide the thermoset product. In certain embodiments, the controller can adjust one or more parameters of the at least one actuator to produce the 3D object based on a reaction rate between a first reactive component, a second reactive component, and a third reactive component to provide the thermoset product. In certain embodiments, the controller can adjust one or more parameters of the at least one actuator to produce the 3D object based on a reaction rate between a first reactive component, a second reactive component, and at least one additional reactive component (e.g., three, four, five, six, seven, eight, nine, or ten total reactive components) to provide the thermoset product.

Applicant has surprisingly discovered that adjusting one or more parameters of the at least one actuator to produce the 3D object based on a reaction rate between the reactive components can provide an unexpectedly superior 3D printed object as compared to methods in the art. In certain embodiments, the one or more parameters can comprise at least one of a time per layer of thermoset product, a flow rate of the thermoset product through the extrusion nozzle, a viscosity of the thermoset product through the extrusion nozzle, a cure acceleration of the thermoset product, a layer translation path, a layer pattern, a seam structure, movement speed, and corner speed.

In certain embodiments, a time per layer of the thermoset product can be adjusted to optimize the time between layers extruded by the extrusion nozzle. Depending on the properties of the reactive components and the geometry of the desired final 3D product, the time per layer adjustment can vary. As used herein, the term "time per layer of thermoset product" means the minimum amount of time which should elapse before a next layer can be deposited on top of it.

In certain embodiments, the minimum time per layer of thermoset product can be from about 10 seconds to several hours. In certain embodiments, the time per layer of thermoset product can be from about 30 seconds to about 30 minutes. In certain embodiments, the time per layer of thermoset product can be from about 60 seconds to about 20 minutes. In certain embodiments, the time per layer of thermoset product can be about 10 seconds, about 20 seconds, about 30 seconds, about 40 seconds, about 50 seconds, about 60 seconds, about 2 minutes, about 3 minutes, about 4 minutes, about 5 minutes, about 6 minutes, about 7 minutes, about 8 minutes, about 9 minutes, about 10 minutes, about 15 minutes, about 20 minutes, about 25 minutes, about 30 minutes, about 35 minutes, about 40 minutes, 50 minutes, 1 hour, 1.5 hours, 2 hours, or any ranges between the specified values. If an insufficient amount of time has elapsed between depositing a layer and subsequently depositing another layer, when the next layer is deposited, it can melt or flow into the prior layer. In certain embodiments, a layer has height x, and when the next layer is deposited, the height of the part can be 2x. If an insufficient amount of time has elapsed, after the next layer is deposited, the height can be less than 2x. In certain embodiments, if the height is within about 5% of 2x, the minimum time can be said to have elapsed In certain embodiments, a flow rate of the thermoset product through the extrusion nozzle can be adjusted to optimize the flow rate through the extrusion nozzle. Depending on the properties of the reactive components and the geometry of the desired final 3D product, the flow rate adjustment can vary. As used herein, the term "flow rate through the extrusion nozzle" means a volumetric flow rate, or a volume of material in $mm^3$ that is pushed through the nozzle in a second. The rate can vary depending on the tip diameter. In certain embodiments, the minimum rate can be set by the strength of the pump on the printer. In certain embodiments, the flow rate can controlled by the setting the pump displacement.

In certain embodiments, the flow rate through the extrusion nozzle can be from about 0.01 $mm^3/s$ to about 1 $mm^3/s$. In certain embodiments, the flow rate can be from about 0.05 $mm^3/s$ to about 0.75 $mm^3/s$. In certain embodiments, the flow rate can be from about 0.1 $mm^3/s$ to about 0.5 $mm^3/s$. In certain embodiments, the flow rate can be about 0.01 $mm^3/s$, about 0.02 $mm^3/s$, about 0.03 $mm^3/s$, about 0.04 $mm^3/s$, about 0.05 $mm^3/s$, about 0.06 $mm^3/s$, about 0.07 $mm^3/s$, about 0.08 $mm^3/s$, about 0.09 $mm^3/s$, about 0.1 $mm^3/s$, about 0.15 $mm^3/s$, about 0.2 $mm^3/s$, about 0.25 $mm^3/s$, about 0.3 $mm^3/s$, about 0.35 $mm^3/s$, about 0.4 $mm^3/s$, about 0.45 $mm^3/s$, about 0.5 $mm^3/s$, about 0.55 $mm^3/s$, about 0.6 $mm^3/s$, about 0.65 $mm^3/s$, about 0.7 $mm^3/s$, about 0.75 $mm^3/s$, about 0.8 $mm^3/s$, about 0.85 $mm^3/s$, about 0.9 $mm^3/s$, about 0.95 $mm^3/s$, about 1 $mm^3/s$, or any ranges between the specified values. In certain embodiments, the flow rate of the material, combined with the volume of the mixing chamber, can set the extent of reaction of the material at the time that it leaves the nozzle. For example, if the printer is printing at 0.1 $mm^3/s$ and the mixer has a volume of 2 $mm^3$, then the reaction mixture can be, on average, about 20 seconds into its reaction. If the flow rate is decreased to 0.01 $mm^3/s$, then the reaction mixture can be, on average, about 200 seconds into its reaction.

In certain embodiments, a viscosity of the thermoset product through the extrusion nozzle can be adjusted to optimize the viscosity of the thermoset product through the extrusion nozzle. Depending on the properties of the reactive components and the geometry of the desired final 3D product, the viscosity can vary. Viscosity increases as a function of molecular weight of a polymer. Viscosity also increases as a function of concentration of urethane and urea linkages in the material. Therefore, for a given A (isocyanate blend) and B (polyol blend), as they react, the viscosity will increase. For example, for a given A and B, if a mixture leaves the extrusion nozzle at 200 seconds, it can have a higher extent of reaction, higher density of urethane/urea groups, and higher molecular weight than if it leaves the extrusion nozzle at 20 seconds. In certain embodiments, as the time from mixing of reactive components to the time a mixture leaves an extrusion nozzle increases, the viscosity can increase.

In certain embodiments, a material with a higher extent of reaction can give a bead with a different aspect ratio (cross-sectional width over height) than one with a lower extent of reaction. In certain embodiments, the aspect ratio can be from about 1 to about 10. In certain embodiments, the aspect ratio can be from about 1 to about 5. In certain embodiments, the aspect ratio about 1, about 1.5, about 2, about 2.5, about 3, about 3.5, about 4, about 4.5, about 5, about 6, about 7, about 8, about 9, about 10, or any ranges between the specified values. In certain embodiments, the aspect ratio can be inversely proportional to the viscosity. For example, an aspect ratio of 1 will be for a higher viscosity bead than an aspect ratio of 5, which is for a lower viscosity bead.

Applicant has surprisingly found that controlling aspect ratio of the bead can provide for printing optimization and provide for a printed 3D object with desirable object resolution. In certain embodiments, the aspect ratio can be used to set the space filling attributes of a material. In certain embodiments, the aspect ratio is related to the extent of polymerization of a material and the viscosity of a material. For example, if an aspect ratio is 5, then the layer height is shorter, but the translation path of the printhead can travel with a greater distance between adjacent beads. Comparatively, if an aspect ratio is 1, then the translation path provides that adjacent beads be placed closer to produce a solid part. In certain embodiments, the flow rate through the printhead, which sets its viscosity and therefore bead aspect ratio, can be used to set resolution, as well as overall printing speed. At slower flow rates and low aspect ratios, the print resolution can be the bead width. At higher flow rates, the high aspect ratio allows a layer to be filled quickly with fewer adjacent beads. The resolution can be the wider bead width associated with the lower viscosity.

In certain embodiments, a controller can analyze aspect ratio and print a 3D object based on the aspect ratio of a bead. For example, the controller can instruct the 3D printer to print with a low aspect ratio/high viscosity bead for certain aspects of a 3D object and then the controller can instruct the 3D printer to print with a high aspect ratio/low viscosity bead for other aspects of a 3D object. This controlling of aspect ratio can provide a 3D object with high resolution, e.g., on the edges of a 3D object, and then use increased printing speeds to space fill aspects of a 3D object.

In certain embodiments, a cure acceleration of the thermoset product can be adjusted to optimize the cure acceleration of the thermoset product. Depending on the properties of the reactive components and the geometry of the desired final 3D product, the cure acceleration can vary. In certain embodiments, a cure acceleration can be achieved by increasing the extent of reaction at a given time. In certain embodiments, an accelerant can be a catalyst or a formula with reactants designed with higher reactivity.

In certain embodiments, a layer translation path can be adjusted to optimize the layer translational path of the extruded thermoset product. Depending on the properties of the reactive component and the geometry of the desired final 3D product, the layer translational path can vary. As used herein the term "layer translation path" means the path that is traversed by the printhead while depositing material in the layer. In certain embodiments, the path can be followed to deposit material in the areas that have been specified by the slicing application. In certain embodiments, the layer translational path can be chosen such that a minimum amount of time elapses before an adjacent bead is placed. In certain embodiments, this minimum amount of time can be from about 1 second to about 5 minutes. In certain embodiments, this minimum amount of time can be from about 5 seconds to about 1 minute. In certain embodiments, this minimum amount of time can be about 1 second, about 5 seconds, about 10 seconds, about 15 seconds, about 20 seconds, about 25 seconds, about 30 second, about 35 seconds, about 40 seconds, about 45 seconds, about 50 seconds, about 60 second, about 90 seconds, about 2 minutes, about 3 minutes, about 4 minutes, about 5 minutes, or any ranges between the specified values. If an insufficient amount of time has elapsed, the beads can combine and form a bead with a different aspect ratio than a single bead. In certain embodiments, the algorithm which constructs a translation path can control a layer translation path such that a bead deformation does not occur when beads are placed adjacent to one another.

In certain embodiments, a layer pattern can be adjusted to optimize the layer pattern of the extruded thermoset product. Depending on the properties of the reactive component and the geometry of the desired final 3D product, the layer pattern can vary. As used herein the term "layer pattern" means the pattern that is traversed by the printhead while depositing material in the layer. In certain embodiments, a layer pattern can be the systematic path that the printhead is directed to fill an area. In certain embodiments, a layer pattern can be to fill a circle with concentric circles from the outside in. In certain embodiments, a layer pattern can be a pattern where adjacent parallel lines are placed. In certain embodiments, the layer pattern can be chosen such that a minimum amount of time elapses before an adjacent bead is placed. In certain embodiments, this minimum amount of time can be from about 1 second to about 5 minutes. In certain embodiments, this minimum amount of time can be from about 5 seconds to about 1 minute. In certain embodiments, this minimum amount of time can be about 1 second, about 5 seconds, about 10 seconds, about 15 seconds, about 20 seconds, about 25 seconds, about 30 second, about 35 seconds, about 40 seconds, about 45 seconds, about 50 seconds, about 60 second, about 90 seconds, about 2 minutes, about 3 minutes, about 4 minutes, about 5 minutes, or any ranges between the specified values. If an insufficient amount of time has elapsed, the beads can combine and form a bead with a different aspect ratio than a single bead. In certain embodiments, the algorithm which constructs a fill pattern can control a layer pattern such that a bead deformation does not occur when beads are placed adjacent to one another.

In certain embodiments, a seam structure can be adjusted to optimize the seam structure of the extruded thermoset product. Depending on the properties of the reactive components and the geometry of the desired final 3D product, the seam structure can vary. As used herein, the term "seam structure" means the vertical line formed when each layer begins printing at the same X, Y point.

In certain embodiments, a movement speed can be adjusted to optimize the movement speed of the extruded thermoset product and of the extrusion nozzle. Depending on the properties of the reactive components and the geometry of the desired final 3D product, the movement speed can vary. As used herein, the term "movement speed" means the linear speed traversed by a printhead. In certain embodiments, the movement speed can be from about 1 mm/s to about 50 mm/s. In certain embodiments, the movement speed can be from about 2 mm/s to about 25 mm/s. In certain embodiments, the movement speed can be about 1 mm/s, about 2 mm/s, about 3 mm/s, about 4 mm/s, about 5 mm/s, about 6 mm/s, about 7 mm/s, about 8 mm/s, about 9 mm/s, about 10 mm/s, about 11 mm/s, about 12 mm/s, about 13 mm/s, about 14 mm/s, about 15 mm/s, about 16 mm/s, about 17 mm/s, about 18 mm/s, about 19 mm/s, about 20 mm/s, about 21 mm/s, about 22 mm/s, about 23 mm/s, about 24 mm/s, about 25 mm/s, or any ranges between the specified values.

In certain embodiments, a corner speed can be adjusted to optimize the corner speed of the extruded thermoset product and of the extrusion nozzle. Depending on the properties of the reactive components and the geometry of the desired final 3D product, the corner speed can vary. As used herein the term "corner speed" can mean a minimum turning radius for a given linear speed. As each curve in a 3D printed bead is made up from several linear segments this ability to change direction can be expresses as a maximum angular velocity where;

$$\text{maximum angular velocity } \omega = \frac{d\theta}{dt}$$

and where $\theta$ is the corner angle and $$\text{maximum linear velocity } v = \omega r$$

where $r$ is the radius of the corner

In certain embodiments, the controller can adjust one or both of the amount and flow rate of one or more of first, second, and third reactive components to provide a thermoset product for the first area of the 3D object design to provide the physical property of the first area that is different than the same physical property of the second area. In certain embodiments, the physical property can be one or more of flexibility, color, optical refractive index, hardness, porosity, and density.

In certain embodiments, the controller can be configured to execute or the method further comprises adjusting one or both of an amount and a flow rate of a gas-generation source for use with one or more of a first, second, and third reactive components.

In certain embodiments, the controller can be configured to execute or the method further comprises controlling a distance between the extrusion nozzle and the 3D object. Applicant has surprisingly discovered that controlling a distance between the extrusion nozzle and the 3D object can provide an unexpectedly superior 3D printed object as compared to methods in the art.

In certain embodiments, the controller can be configured to detect an obstruction within the extruded thermoset printing apparatus. In certain embodiments, the controller can be configured to remove an obstruction within the extruded thermoset printing apparatus. During 3D printing, reactive components can obstruct, clog, block, or fill a part of the extruded thermoset printing apparatus. By using the controller to detect and remove an obstruction, a uniform and accurate 3D printed object can be printed. In certain embodiments, the obstruction can be inside the the extruded thermoset printing apparatus (e.g., on the inside of the nozzle). In certain embodiments, the obstruction can be on the exterior of the extruded thermoset printing apparatus (e.g., on the outside of the nozzle or on the tip of the nozzle).

In certain embodiments, the obstruction is removed automatically, e.g., by purging to a disposal cup. In certain embodiments, the obstruction is removed manually, e.g., by manually wiping the nozzle.

Exemplary systems, apparatus, devices, methods, and processes shall be described with reference to FIGS. 1-2. It will be apparent to one skilled in the art that elements or processes from one embodiment may be used in combination with elements or processes of the other embodiments, and that the possible embodiments of such systems, apparatus, devices, methods, and processes using combinations of features set forth herein is not limited to the specific embodiments shown in the figures and/or described herein. Further, it will be recognized that the embodiments described herein may include many elements that are not necessarily shown to scale. Still further, it will be recognized that timing of the processes and the size and shape of various elements herein may be modified but still fall within the scope of the present disclosure, although certain timings, one or more shapes and/or sizes, or types of elements, may be advantageous over others.

The exemplary 3D object production system 10 used to execute, or perform, the exemplary methods and/or processes described herein is further depicted diagrammatically in FIG. 1. As shown, the exemplary system 10 may include computing apparatus 12. The computing apparatus 12 may be configured to receive input and transmit output to extruded thermoset printing apparatus 100 such that, for example, the computing apparatus 12 may use, or work with, the extruded thermoset printing apparatus 100 to produce a 3D object.

Further, the computing apparatus 12 may include data storage 14. Data storage 14 may allow for access to processing programs or routines 16 and one or more other types of data 18 (e.g., 3D object designs, computer-aided design (CAD) files, sensor data, material properties, parameters, metrics, variables, etc.) that may be employed to perform, or carry out, exemplary methods and/or processes for use in performing control of production of 3D objects and/or translation of 3D designs into one or more printing processes to produce 3D objects. The computing apparatus 12 may be described as being operatively coupled to the extruded thermoset printing apparatus 100 to, e.g., transmit data to and from the extruded thermoset printing apparatus 100. For example, the computing apparatus 12 may be electrically coupled to the extruded thermoset printing apparatus 100 using, e.g., analog electrical connections, digital electrical connections, wireless connections, bus-based connections, etc.

The processing programs or routines 16 may include programs or routines for performing computational mathematics, a slicing application, CAD processes, 3D design translation algorithms and processes, spatial algorithms, process automation algorithms, matrix mathematics, standardization algorithms, comparison algorithms, feedback control loops, or any other processing required to implement one or more exemplary methods and/or processes described herein. Data 18 may include, for example, 3D object design data, 3D object information, parameters, 3D printing parameters, material properties, sensor data, variables, results from one or more processing programs or routines employed according to the disclosure herein, or any other data that may be necessary for carrying out the one and/or more processes or methods described herein.

In one or more embodiments, the system 10 may be implemented using one or more computer programs executed on programmable computers, such as computers that include, for example, processing capabilities, data storage (e.g., volatile or non-volatile memory and/or storage elements), input devices, and output devices. Program code and/or logic described herein may be applied to input data to perform functionality described herein and generate desired output information. The output information may be applied as input to one or more other devices and/or methods as described herein or as would be applied in a known fashion.

The programs used to implement the methods and/or processes described herein may be provided using any programmable language, or code, e.g., a high-level procedural and/or object orientated programming language or code that is suitable for communicating with a computer system. Any such programs may, for example, be stored on any suitable device, e.g., a storage media, that is readable by a general or special purpose program running on a computer system (e.g., including processing apparatus) for configuring and operating the computer system when the suitable device is read for performing the procedures described herein. In other words, at least in one embodiment, the system 10 may be implemented using a computer readable storage medium, configured with a computer program, where the storage medium so configured causes the computer to operate in a specific and predefined manner to perform functions described herein. Further, in at least one embodiment, the system 10 may be described as being implemented by logic (e.g., object code) encoded in one or more non-transitory media that includes code for execution and, when executed by a processor, is operable to perform operations such as the methods, processes, and/or functionality described herein.

The computing apparatus 12 may be, for example, any fixed or mobile computer system (e.g., a controller, a microcontroller, a personal computer, minicomputer, etc.). The exact configuration of the computing apparatus 12 is not limiting, and essentially any device capable of providing suitable computing capabilities and control capabilities may be used as described herein, a digital file may be any medium (e.g., volatile or non-volatile memory, a CD-ROM, magnetic recordable tape, etc.) containing digital bits (e.g., encoded in binary, etc.) that may be readable and/or writeable by computing apparatus 12 described herein. Also, as described herein, a file in user-readable format may be any representation of data (e.g., ASCII text, binary numbers, hexadecimal numbers, decimal numbers, graphically, etc.) presentable on any medium (e.g., paper, a display, etc.) readable and/or understandable by an operator.

In view of the above, it will be readily apparent that the functionality as described in one or more embodiments according to the present disclosure may be implemented in any manner as would be known to one skilled in the art. As such, the computer language, the computer system, or any other software/hardware which is to be used to implement the processes described herein shall not be limiting on the scope of the systems, processes or programs (e.g., the functionality provided by such systems, processes or programs) described herein.

The methods and/or logic described in this disclosure, including those attributed to the systems, or various constituent components, may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, or other devices. The term "processor" or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems, devices and methods described in this disclosure may be embodied as instructions and/or logic on a computer-readable medium such as RAM, ROM, NVRAM, EEPROM, FLASH memory, magnetic data storage media, optical data storage media, or the like. The instructions and/or logic may be executed by one or more processors to support one or more aspects of the functionality described in this disclosure.

The extruded thermoset printing apparatus 100 may include any one or more devices, mechanisms, and structures so as to be capable of performing the 3D object generation or printing as described herein. Generally, as shown in FIG. 2, the extruded thermoset printing apparatus 100 may include at least a first reactant chamber for holding, or contain, a first reactant and one or more additional reactant chambers, or nth reactant chamber, for holding, or contain, additional or nth reactants. The reacting chambers may be operably coupled to a mixing chambers such that the reactants may be mixed to produce, or provide, thermoset product as described herein. The mixing chamber may be operably coupled to the extrusion nozzle, which can deliver the thermoset product to a production chamber where the 3D object is being printed or formed.

Figure 2:
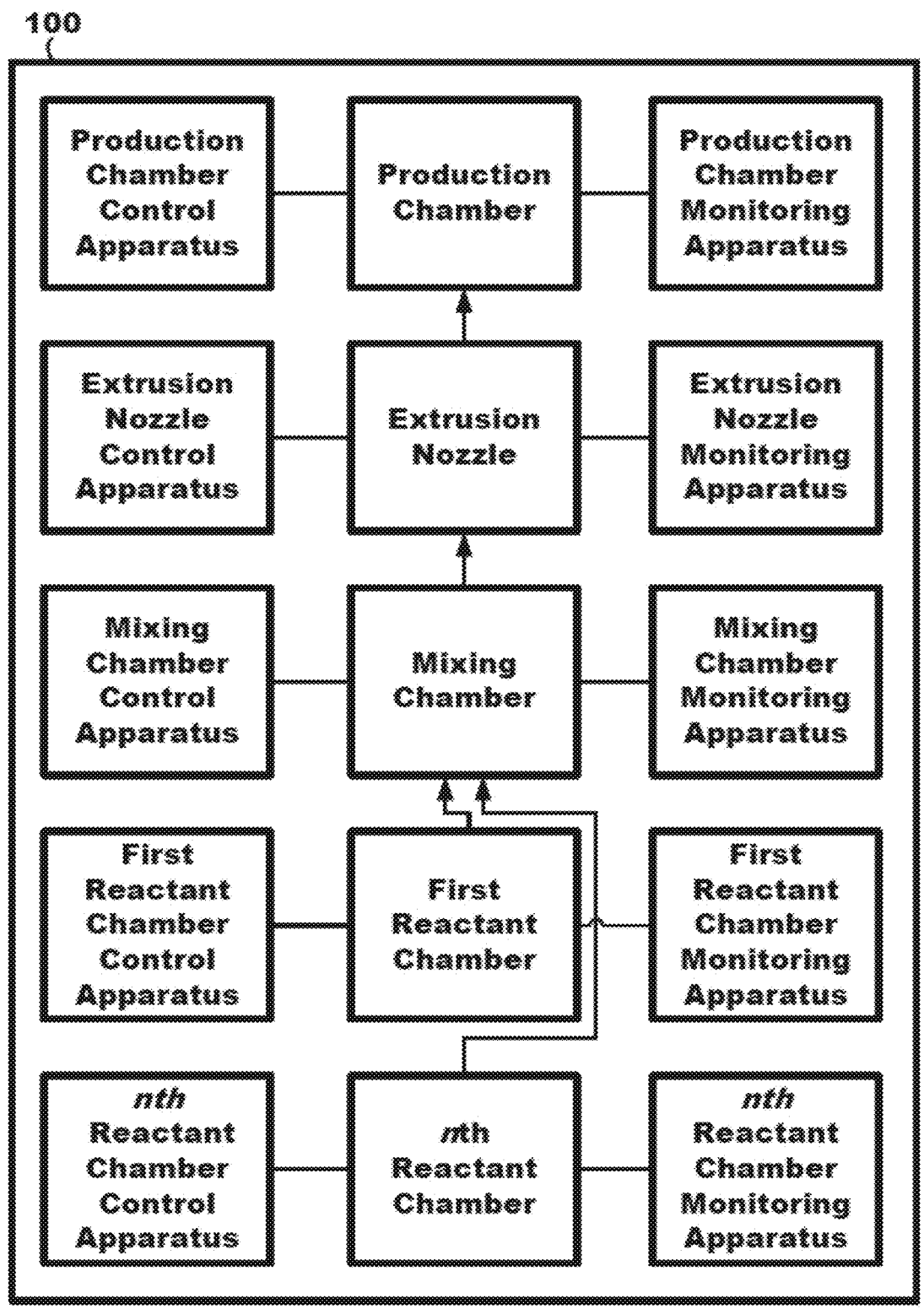
FIG. 2 is a block diagram of extruded thermoset printing apparatus of the system of FIG. 1.

Each of the portions or items of the system 100, some of which are depicted in FIG. 2, may have corresponding monitoring apparatus operably coupled thereto. For example, the apparatus 100 may include first reactant chamber monitoring apparatus operably coupled to the first reactant chamber to monitor one or more parameters and/or variables related thereto, and nth reactant chamber monitoring apparatus operably coupled to the nth reactant chamber to monitor one or more parameters and/or variables related thereto. Further, the apparatus 100 may include mixing chamber monitoring apparatus, extrusion nozzle monitoring apparatus, and production monitoring apparatus operably coupled to the mixing chamber, extrusion nozzle, and production chamber, respectively, to monitor one or more parameters and/or variables related thereto.

Each of the portions or items of the system 100, some of which are depicted in FIG. 2, may have corresponding control apparatus operably coupled thereto. For example, the apparatus 100 may include first reactant chamber control apparatus operably coupled to the first reactant chamber to control, modify, or adjust one or more settings, parameters, and/or processes related thereto, and nth reactant chamber control apparatus operably coupled to the nth reactant chamber to control one or more settings, parameters, and/or processes related thereto. Further, the apparatus 100 may include mixing chamber control apparatus, extrusion nozzle control apparatus, and production control apparatus operably coupled to the mixing chamber, extrusion nozzle, and production chamber, respectively, to control one or more settings, parameters, and/or processes related thereto.

Figure 3:
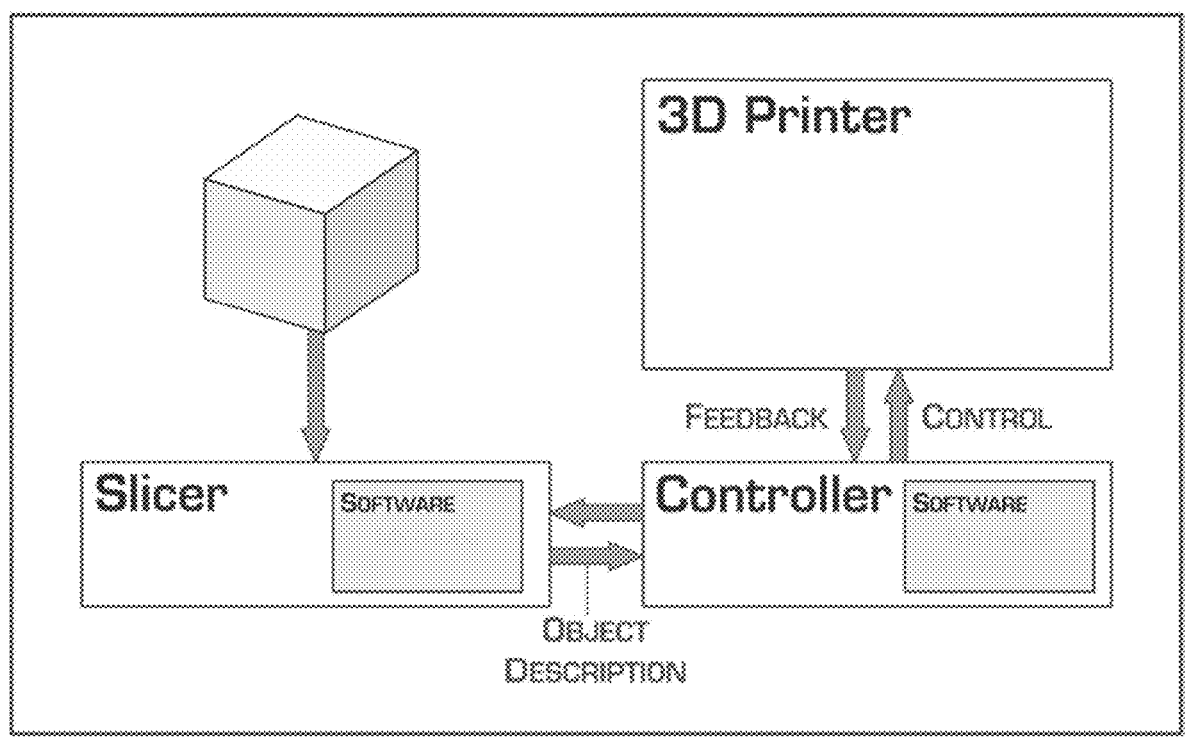
FIG. 3 is a block diagram of an exemplary 3D object production system.

FIG. 3 is a block diagram of an exemplary 3D object production system. In FIG. 3, the slicing application software sends an object description to a controller. The controller sends control instructions to a 3D printer to print a 3D object. The 3D printer sends feedback to the controller, which then sends feedback to the slicing application.

Figure 4:
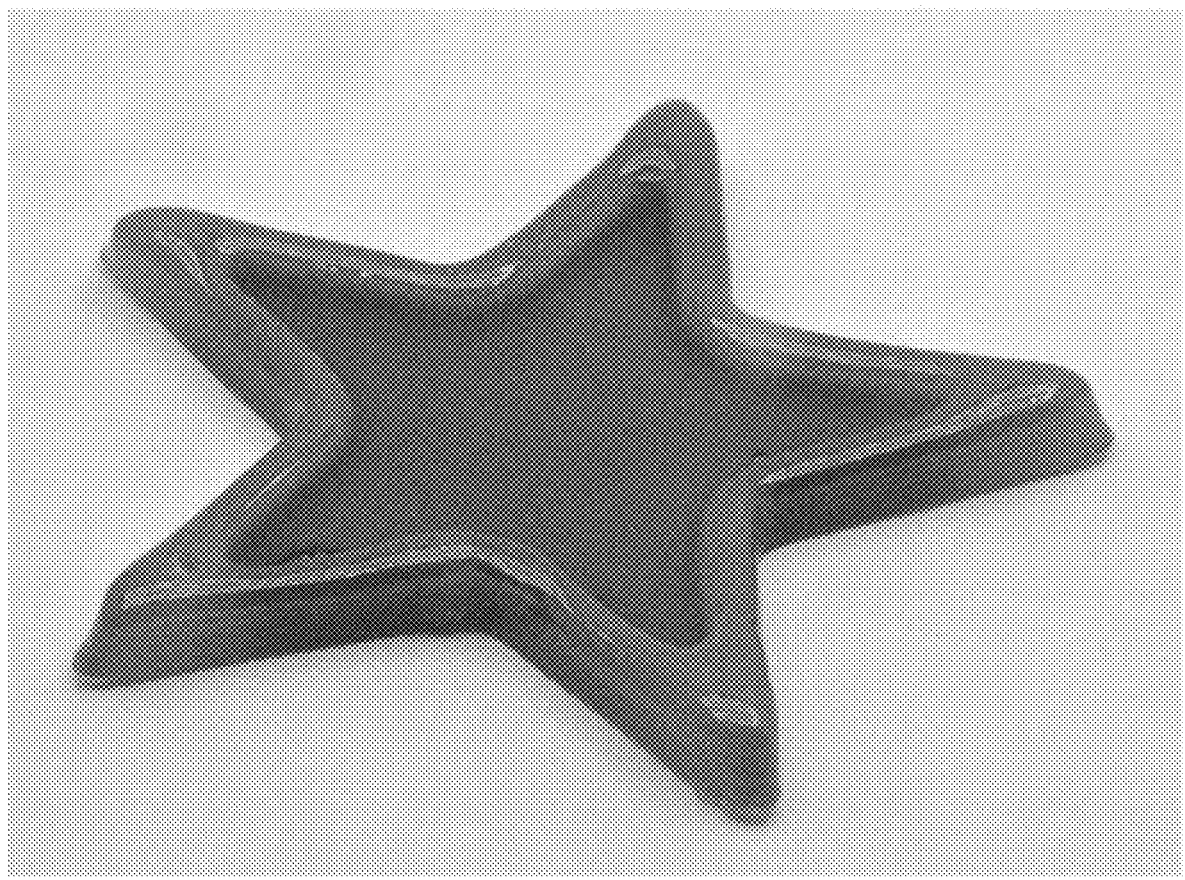
FIG. 4 is a printed 3D object having two different thermoset components.

FIG. 4 is a printed 3D object having two different thermoset components. The 3D object has the shape of a star. The interior darker colored portion of the star is composed of a hard thermoset material. The exterior lighter colored portion of the star is composed of a soft thermoset material.

Figure 5:
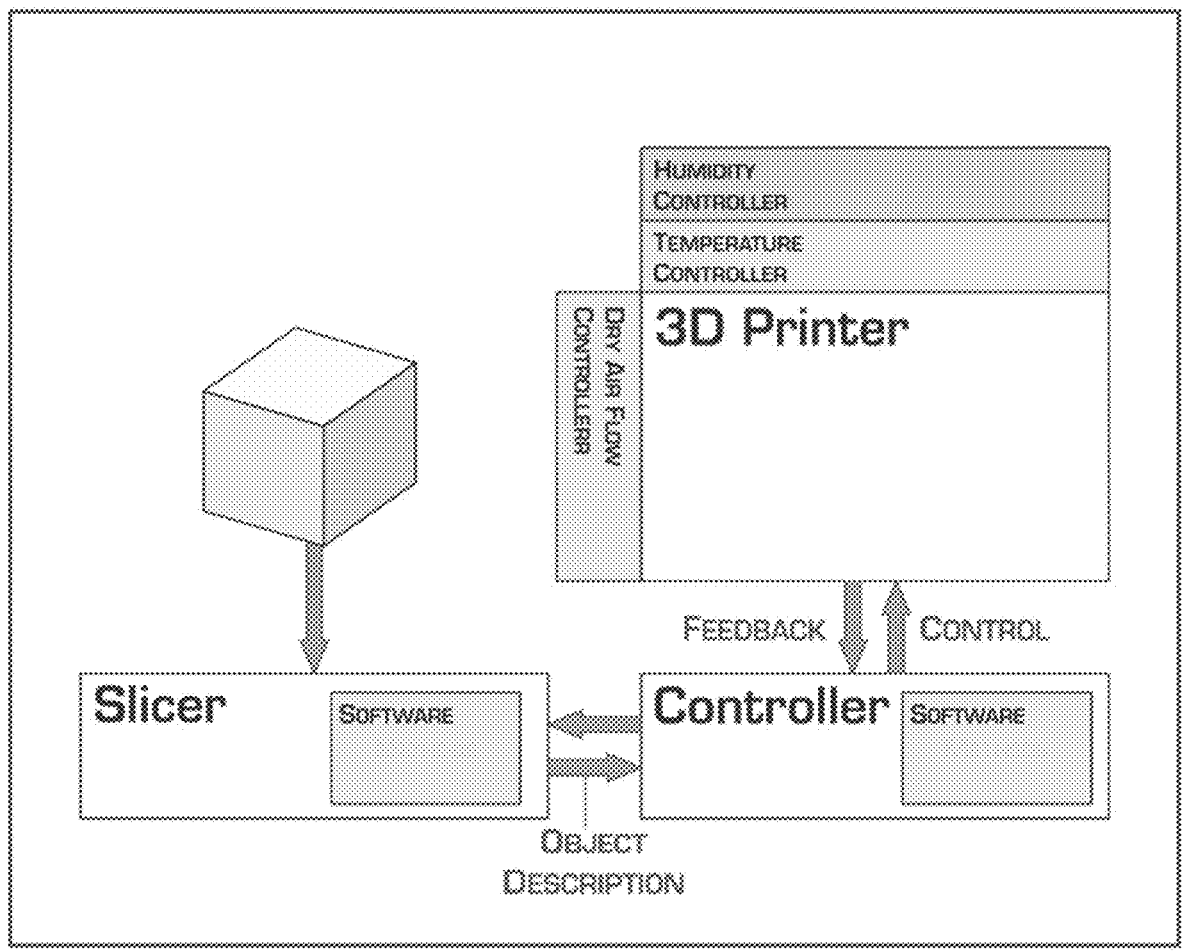
FIG. 5 is a block diagram of an exemplary 3D object production system.

FIG. 5 is a block diagram of an exemplary 3D object production system. In FIG. 5, the slicing application software sends an object description to a controller. The controller sends control instructions to a 3D printer to print a 3D object. The 3D printer sends feedback to the controller, which then sends feedback to the slicing application. The 3D printer contains controllers for monitoring and controlling humidity, temperature, and dry air flow.

Various three-dimensional (3D) object production methods and systems may be used with the exemplary methods and systems described herein such, e.g., U.S. Provisional Application Ser. No. 62/430,919, filed Dec. 6, 2016, U.S. Provisional Application Ser. No. 62/524,214, filed Jun. 23, 2017, and PCT Patent Application entitled "MANUFACTURE OF THREE DIMENSIONAL OBJECTS FROM THERMOSETS" and filed on the same day as the present application, each of which are incorporated by reference herein in their entireties.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the apparatus and methods described herein. Various modifications of the illustrative embodiments, as well as additional embodiments of the disclosure, will be apparent upon reference to this description.

EXAMPLES

The 3D object production system and methods disclosed herein are now further detailed with reference to the following examples. These examples are provided for the purpose of illustration only and the embodiments described herein should in no way be construed as being limited to these example. Rather, the embodiments should be construed to encompass and an all variations which become evidence as a result of the teaching provided herein.

Example 1A

An apparatus capable of dispensing accurate amounts of several reactive components can be used to create 3D objects with a range of physical properties.

Process

A 3D Model portraying the filled star (shown in FIG. 4) was created using the Solidworks 2018 CAD software and exported as an STL file. The model was designed with (1) a raised outline and (2) an inner flat area.

The STL file was processed using an off the shelf "slicing" application to create G-Code descriptions of the actions required to create each individual area with a unique thermoset material.

Area 1, the outer raised area of the star, was built using Thermoset 1, having a red color and a hardness of Shore 60A. Area 2, the inner filled area of the star was built using Thermoset 2, having a green color and a hardness of Shore 95A As shown in Table 1, Thermoset 1 was produced by mixing using two reactive components, A1 and B1; Thermoset 1 was produced by mixing using two reactive components, A2 and B2:

TABLE 1

| Reactive component A1 | | Reactive component A2 | |
|---|---|---|---|
| Isocyanate Prepolymer Red tint | | Isocyanate Prepolymer Yellow tint | |
| Starting viscosity | 5300 cp | Starting viscosity | 5300 cp |
| Reactive component B1 | | Reactive component B2 | |
| Polyol Prepolymer Blue Tint | | Polyol Prepolymer 2 Blue Tint | |
| Starting Viscosity | 2660 cp | | |

The ratio of isocyanate:prepolymer was lower for Reactive component A1 compared to Reactive component A2. Reactive component B2 had a larger weight percentage of prepolymer as compared to Reactive component B1.

The model was printed in two separate operations using a Hyrel Engine SR printer with a modified CSD-30 Extruder.

Operation 1

The outer star was printed using Thermoset 1 to produce 6 layers of a geometric pattern defined by the slicing application. Each layer was deposited using the following parameters.

Bead height: 0.8 mm
Bead width: 1.2 mm
Linear speed: 25 mm/s
Flowrate: 24 mm$^3$/s Operation 2

The inner filled star was printed using Thermoset 2 to produce 4 layers of a geometric pattern defined by the slicing application with the same parameters.

The printed object shown in FIG. 4 demonstrates that (1) each thermoset material is capable of forming a dimensionally accurate representation of the 3D model created by the CAD program, and (2) the two thermoset materials bond to form a single object with unique properties, in this case color and hardness.

Example 1B

Example 1A was created using a Hyrel extruder that is only capable of extruding two reactive components at any time. The addition of an extruder capable of combining and extruding multiple reactive components will allow:

1. Areas with unique properties to be extruded simultaneously; and
2. Reactive components to be blended in precise ratios to create specific properties from reactive components with specific unique properties.

Figure 6:
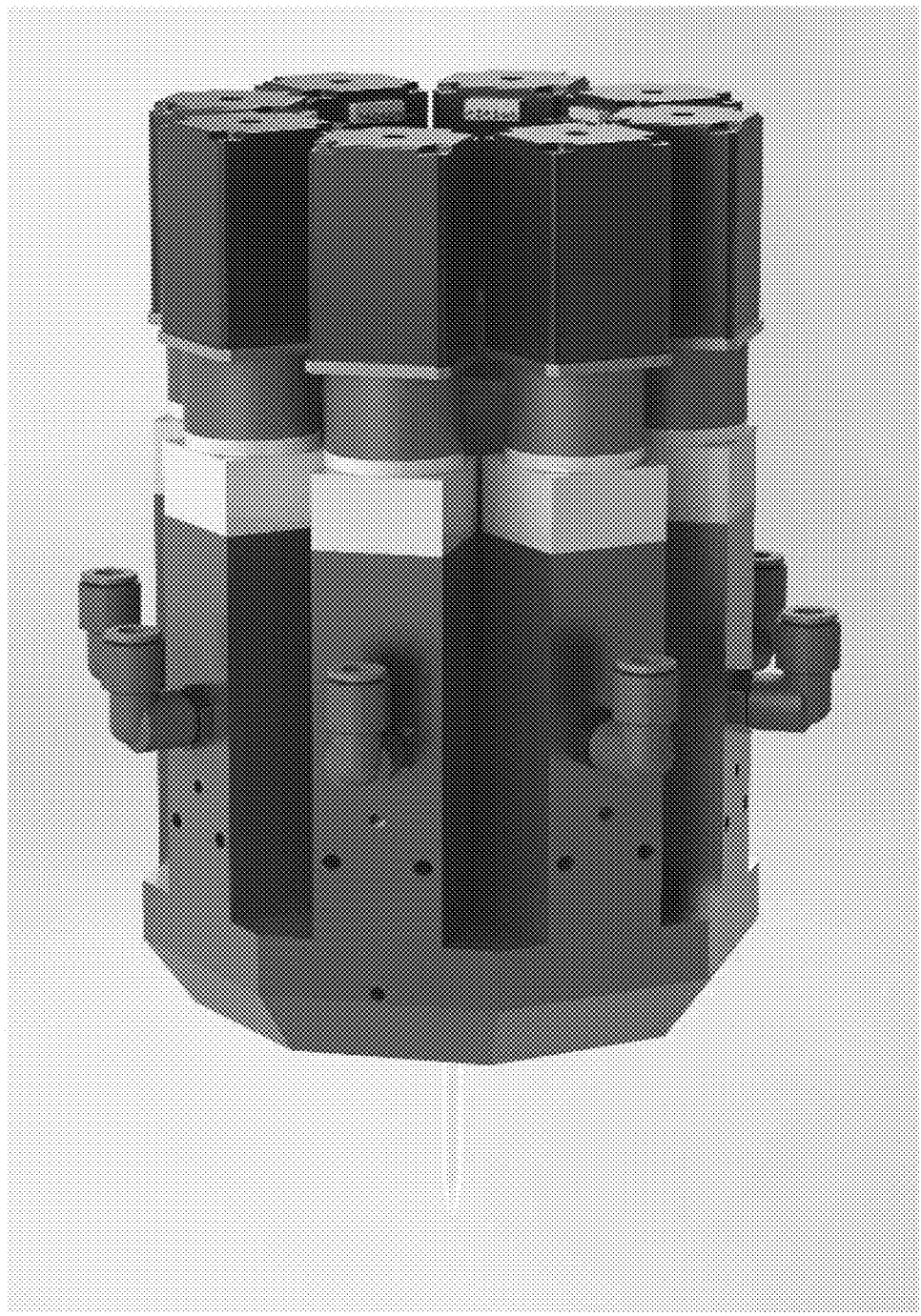
FIG. 6 is an extruder capable of combining up to 8 reactive components.

FIG. 6 shows an extruder capable of combining up to 8 reactive components.

This type of extruder in FIG. 6 would be capable of creating the star in a single operation by selectively extruding reactive components A1 and B1 to create Thermoset 1 while describing the outer raised area of the star shown in FIG. 1 and extruding reactive components A2 and B2 to create Thermoset 2 while describing the inner filled area of the star shown in FIG. 4. Additionally, this type of extruder could create areas with blended properties by combining Thermosets 1 and 2 in specific ratios.

For example, the extruder in FIG. 6 could be used as shown in Table 2:

| Thermoset 1 | Thermoset 2 | Hardness |
|---|---|---|
| 100% (24 mm$^3$/s) | 0% (0.00 mm$^3$/s) | Shore 60A |
| 50% (12 mm$^3$/s) | 50% (12 mm$^3$/s) | Shore 75A |
| 0% (0.00 mm$^3$/s) | 100% (24 mm$^3$/s) | Shore 90A |

In this way, combining reactive components can generate specific properties, including hardness, color, optical refractive index, density (foam), and porosity (foam), in precise ratios and can create blended properties within defined areas of the model being constructed.

By providing the "slicing" application with a mechanism to understand the relationship between the mix ratios of each of the reactive components and each specific property, a continuous spectrum of properties may be created.

For example, to print the star described in Example 1A in a single operation with the hardness of each point within the model being specified be achieved by the following steps.

By storing a description of each reactive component A1, A2, B1, and B2 within the slicing application and by using those parameters within a proprietary algorithm the slicing application would generate G-Code with description of the flowrate used to create a parameter value.

This G-Code description could allow a properly configured 3D object manufacturing system to control the flowrate of 4 reactive components to create a thermoset material with a hardness blended between Shore 60A and Shore 90A.

The addition of colored tints in the proper ratio would allow the system described above to create blended colors. The addition of water in the proper ratio would allow the system described above to generate foam with a specified density and porosity.

Example 2

Obstructions within the mixing chamber or extrusion nozzle of the extrusion system described in Example 1 can occur for a variety of reasons. Identification of an obstruction and the initiation of corrective actions are a fundamental to the development of a productive system for the creation of 3D objects with thermosets.

To identify an obstruction the operating parameters of the extrusion system and the reactive component flow must be monitored and compared against normal operating conditions.

Figure 7:
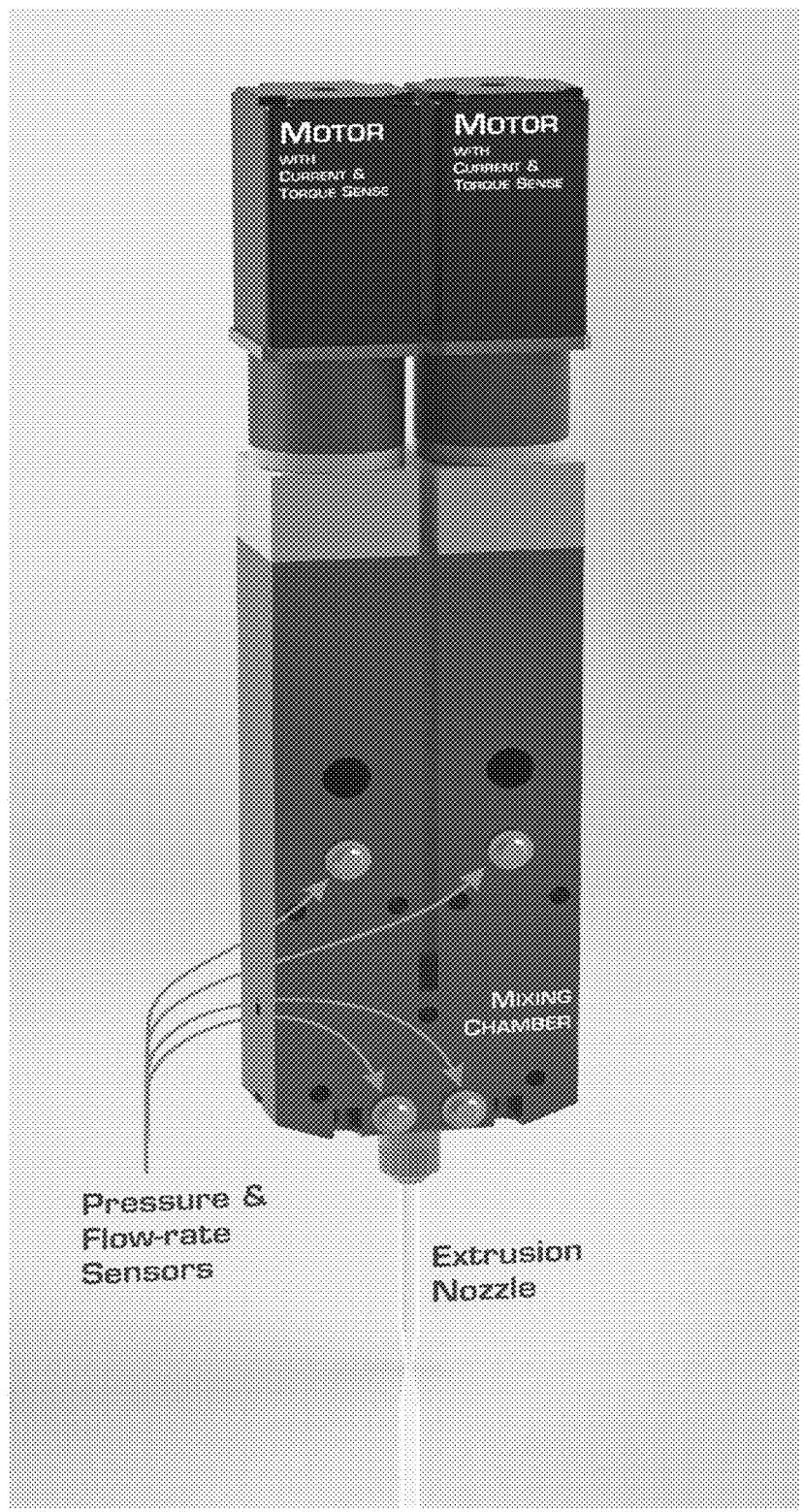
FIG. 7 is an extruder and extrusion nozzle.

FIG. 7 shows an extrusion system similar to that shown in FIG. 6. Both systems use several identical ViscoTec 5/5 liquid pumps feeding a mixing chamber with an extrusion nozzle. FIG. 4 uses shows 2 liquid pumps for simplicity.

Motor Current/Torque

The current drawn by each motor driving a liquid pump can be measured. For a DC motor, the torque required to drive the liquid pump can be proportional to the current drawn by the motor.

Obstructions in the extrusion system lead to the motor driving the liquid pump deliver more torque and therefore cause the motor to draw a higher current.

In normal operating, the current drawn by the motors driving the ViscoTec 5/5 liquid pump range is between 0.5 A and 1.25 A. While peaks above 1.25 A are possible extended current draws of greater than 1.25 A strongly suggest the presence of an obstruction.

Reactive Component Pressure

The pressure of a reactive component can be measured using a pressure transducer. The pressure of each reactive component can be measured prior to the liquid pump and within the mixing chamber, prior to the extrusion nozzle.

Obstructions can be characterized by an increase in pressure in the mixing chamber and are strongly suggested when the pressure in the mixing chamber becomes higher than the pressure prior to the liquid pump.

Actual reactive component pressures depend on the viscosity of the component but for a component with a viscosity of 40,000 cp a pressure of 80 psi prior to the liquid pump is typical and while the pressure at the extrusion nozzle increases to create increased flow the pressure in the mixing chamber should remain significantly below 60 psi.

Reactive Component Flowrate

The flowrate of a reactive component can be measured using variety of sensor technologies. The flowrate of each reactive component is measures prior to the liquid pump and at the outflow of the mixing chamber.

Obstructions can cause either a complete or part reduction of the flow of material. Unfortunately, a lack of material or a pressure failure can also cause the material flowrate to reduce or stop completely. By measuring both the pressure and material flowrate prior to the liquid pump and at the outflow of the mixing chamber the presence of an obstruction be ascertained. The logic table used to identify the likelihood of an obstruction is shown in Table 3 below:

TABLE 3

| | Prior to liquid pump | | Mixing chamber outflow | | |
|---|---|---|---|---|---|
| | Flowrate | Pressure | Flowrate | Pressure | State |
| 1 | 0.05-6.0 ml/s | 80 psi | Same as prior to pump | 0-60 psi | Normal |
| 2 | 0 ml/s | 80 psi | 0.05-6.0 ml/s | 0-60 psi | Out of material |
| 3 | 0 ml/s | 80 psi | 0 ml/s | 0 psi | Out of material |
| 4 | 0 ml/s | 0 psi | 0.05-6.0 ml/s | 0-60 psi | Input pressure failure |
| 5 | 0.05-6.0 ml/s | 80 psi | Less than prior to pump | 0-60 psi | Likely obstruction |
| 6 | 0.05-6.0 ml/s | 80 psi | Same as prior to pump | 60-80 psi | Likely obstruction |
| 7 | 0.05-6.0 ml/s | 80 psi | Same as prior to pump | >80 psi | Very likely obstruction |
| 8 | 0.05-6.0 ml/s | 80 psi | 0 ml/s | >80 psi | Very likely obstruction |
| 9 | 0 ml/s | 80 psi | 0 ml/s | >80 psi | Extremely likely obstruction |

The ViscoTec 5/5 liquid pump can accurately pump liquids at a rate of between 0.05 ml/s and 6.0 ml/s Reactive Component Mass In normal operation, the ViscoTec 5/5 extruder is capable of very accurately metering the volume of reactive components extruded.

The cumulative volume of material that is intended to be extruded is noted by the G-Code interpreter running on the 3D printer throughout the production of an object.

By adding force sensors to each corner of the build surface the mass of extruded material can be measured throughout the production of the 3D object.

By monitoring the difference between the intended mass of material to be extruded and the actual mass as measured by the force sensors mounted on the build surface it can be determined if the actual mass of material deposited is significantly less than that intended, suggesting a potential obstruction.

The Color of the Combined Reactive Components

By mounting a color sensor such as the AMS AS7261 Tri-stimulus XYZ_NIR Sensor in the extrusion nozzle, the color of the combined thermoset can be measured.

The color of each reactive component can be controlled by the addition of a tint. The color of the final thermoset can be controlled by the mixture of the tints present in each component. In Example above Reactive component A1 contains a red tint, Reactive component A2 contains a yellow tint, Reactive component B1 contains a blue tint, and Reactive component B2 contains a blue tint.

Combination of any of these components could produce a thermoset with a unique color. Absence or a reduction in the amount of any of the components could result in the extruded thermoset having a measurably different color. Identification of the missing color constituent would suggest a potential obstruction in the extrusion system for that component.

Spectral Analysis of the Combined Reactive Components

By mounting a multi-spectral imaging sensor such as the AMS AS7265x Smart Spectral Sensor within the extrusion nozzle the chemical composition of the extruded material can be characterized.

By comparing the predicted chemical composition of the extruded material against that measured by the sensor would allow the absence of chemical constituents related to a specific reactive component would suggest a potential obstruction in the extrusion system for that component.

Potential Actions

Initiate a delay and notify the operator

Initiate an automated cleaning cycle and notify the operator

Initiate an automated purge of the affected material

Request that the operator initiate a manual cleaning procedure

Optimization of Obstruction Identification

Historical data for each sensor reading could be collected and stored within the 3D printer control system to optimize the identification of obstructions. For example, the pressure limits for each type of reactive component would be monitored and updated during normal operation to provide a more accurate understanding of sensor values that would suggest an obstruction.

Example 3

The system described in Example 2 makes use of flowrate sensors to help identify obstructions within each component extrusion system. Those sensors can also be used during normal operation to compensate for inconsistencies in the flowrate caused by variations in the reactive component parameters or tolerances in hardware such as the extruder nozzle.

Figure 8:
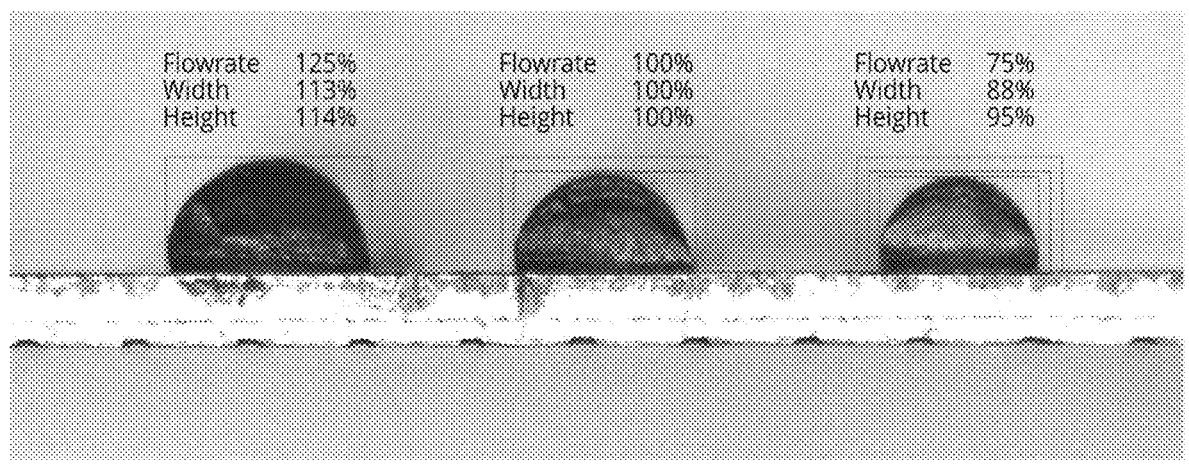
FIG. 8 shows a cross section of three beads.

As can be seen in FIG. 8, small changes in the flowrate of each reactive component can cause non-linear changes to the printed bead height and width.

FIG. 8 shows a cross section of three beads printed using a German RepRap x400i LAM printer with a ViscoTec Duo extruder. Each bead was printed with a thermoset material comprised by 2 reactive components, A1 and B1, as shown in Table 4.

TABLE 4

| Reactive component A1 | Reactive component B1 | |
|---|---|---|
| Isocyanate Prepolymer Red tint Starting viscosity 40,000 cp | Polyol Blue tint Starting viscosity | 40,000 cp |

For the material shown above with an unreacted viscosity of 40,000 cp

100% flowrate (6.0 mm³/s) creates a bead;

| Bead width: | 0.9 mm |
|---|---|
| Bead height | 0.675 mm |

75% flowrate (4.0 mm³/s) creates a bead;

| Bead width: | 0.782 mm |
|---|---|
| Bead height | 0.645 mm |

125% flowrate (8.0 mm³/s) creates a bead;

| Bead width: | 1.017 mm |
|---|---|
| Bead height | 0.766 mm |

Variations in the bead width and particularly the bead height can reduce the quality of the printed object. By monitoring the difference between the desired flowrate and the actual flowrate a Proportional, Derivative, Integral (PID) control algorithm can be employed to optimize the desired flow using a control loop feedback mechanism resulting in a more accurate and stable flow and a more consistent printed bead.

Example 4

The extrusion nozzle described in the previous examples can in certain circumstances accumulate parts of reacted thermoset material on the tip of the nozzle. This "blob" of material can interfere with any previously printed material marking the print and potentially mis-align the extrusion nozzle.

The slicing application can identify opportunities to complete an automated tip cleaning process during the print. The tip cleaning process can cause the extruder to move to the edge of the build platform where a cleaning wipe can remove any accumulated material from the extrusion nozzle.

The cleaning wipe can be located at the beginning of each print and replaced after the print is completed.

Example 5

Thermoset materials such as those described can be affected by the environmental conditions in which they are contained.

The viscosity, flowrate, and reaction rate of a partly reacted thermoset material can depend on its temperature.

Deposition of thermoset material in a high relative humidity environment can cause bubbles in the cured material.

The German RepRap x400i LAM printer is surrounded by a sealed enclosure with integrated sensor and control systems allowing environmental conditions to be monitored and controlled.

The enclosure is connected to an air-line providing cool (15° C.) air with a relative humidity of 0% and kept under positive pressure. Air is introduced at a rate to maintain a relative humidity of less than 15% within the enclosure. Temperature can be maintained at a constant temperature between 15° C. and 25° C. Consistent temperature can provide beneficial 3D printing conditions.

Example 6

As described in Example 5, the viscosity, flowrate, and reaction rate of a thermoset material can depend on temperature.

By monitoring the temperature of the thermoset material, the temperature of the build surface (build plate) and the temperature of the environment within the enclosure described above a number of printing parameters can be optimized for temperature, including;
  a. Time per layer of the thermoset product,
  b. Flow-rate of the extruded thermoset product, and
  c. The Viscosity of the extruded thermoset product
Time Per Layer Each thermoset material has an associated reaction rate. This rate can provide an indication of the rate at which the material will reach a gel state. The reaction rate and therefore the time taken to reach a gel state can depend on temperature. With the reaction rate increasing with temperature and the time taken to reach a gel state reducing.

Figure 9:
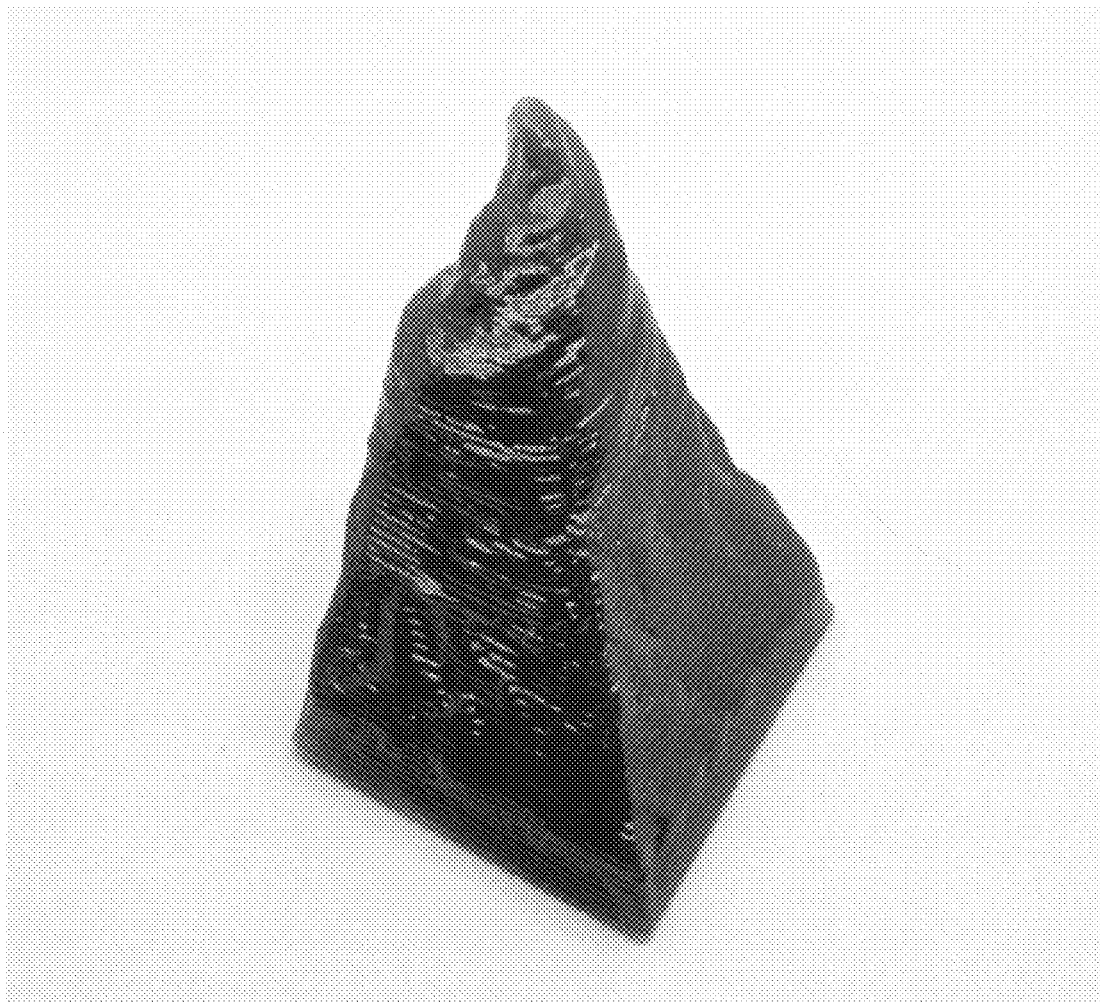
FIG. 9 is a pyramid shaped 3D printed object.

FIG. 9 shows an offset pyramid printed with the material described in Example 3. This material reaches a gel state in approximately 90 seconds at 25 C. At this point the material is self-supporting and resists flow.

The offset pyramid print contains approximately 50 layers printed with the following parameters:
Bead height: 0.675 mm
Bead width: 0.75 mm
Linear speed: 12 mm/s
Flowrate: 6.075 mm³/s Each new layer can be extruded onto a previous layer which has reached a gel state. As the area of each layer reduces the time required to print each layer also reduces from approximately 3.5 minutes at the pyramid's base to under 10 seconds at the pyramid's peak Once approximately half the layers have been printed the time taken to print a layer is less than the time taken to reach a gel state and the subsequent layer is deposited onto a liquid surface causing the print to become unstable.

To create a stable object each layer should have reached a gel state before the next layer is deposited. This can be achieved two ways.
  a. The print can pause to allow the prior layer to reach a gel state.
    The duration of each pause will be;

Pause Duration=Gel Time–Layer Print Time

For example a layer that takes 30 sec to deposit has a 60 sec delay before the next layer is deposited.
  b. The reaction rate of the thermoset material could be increased by the addition of an additional reactive component.
    For example, the thermoset described above with a gel time of 90 seconds at 25 C could have additional catalyst added using an additional component pump, increasing the materials reaction rate and reducing its gel time.

Using the temperature data described in Example 5, the printer control system could be optimized to generate a more accurate inter-layer delay based on a more accurate understanding of the gel time and temperature. For example, shown in Table 5:

TABLE 5

| Temperature | Gel Time |
|---|---|
| 15° C. | 102 s |
| 20° C. | 95 s |
| 25° C. | 90 s |
| 30° C. | 86 s |
| 35° C. | 82 s |

Viscosity/Flowrate

As has been shown in the previous examples:
any change in flowrate can cause a change in the height and width of any extruded bead
any change in temperature can causes a change in the viscosity and flowrate of the extruded material Using the temperature data described in Example 5, the printer control system could be optimized to correct the desired flowrate for the current temperature of the enclosure, build plate or material.

Example 7

Each object is built within a 3-dimensional space described by three perpendicular axis, X, Y and Z.

Seam Structure

The seam is the vertical line formed when each layer begins printing at the same X, Y point. For example, if each layer starts printing from the following coordinates in (X, Y, Z) space a vertical line can become visible on the object due to variations in the starting flowrate of the extruded material.
  a. Layer 5—(100.000, 100.00, 4.000)
  b. Layer 4—(100.000, 100.00, 3.000)
  c. Layer 3—(100.000, 100.00, 2.000)
  d. Layer 2—(100.000, 100.00, 1.000)
  e. Layer 1—(100.000, 100.00, 0.00)

The seam structure can be optimized by moving the starting point of adjacent layers to random locations within the layer.

Corner Speed

Ideally an extruded bead of thermoset material can be made to change direction instantaneously. The physical properties of each unique thermoset material can include its ability to change direction.

Figure 10:
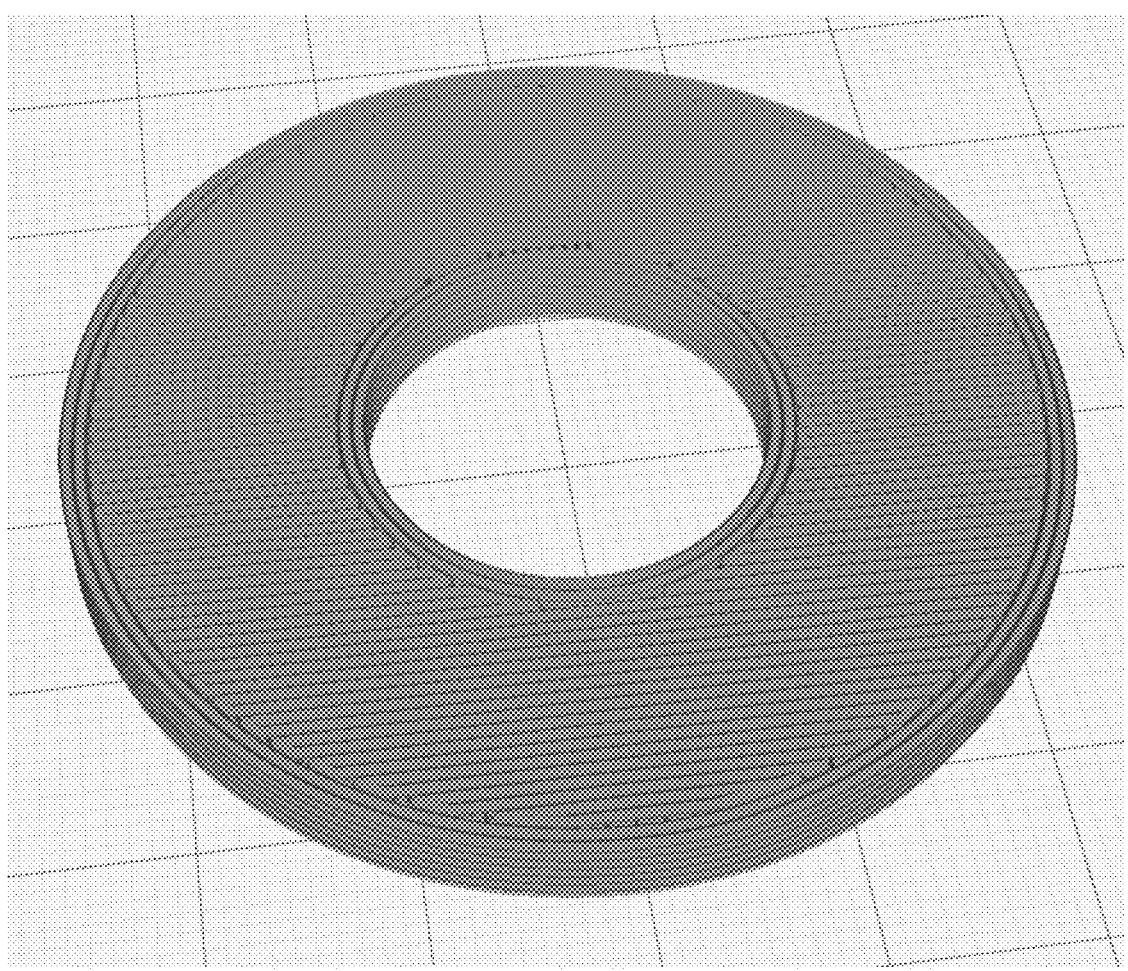
FIG. 10 is a computer diagram of a flattened donut.
Figure 11:
FIG. 11 is a 3D printed flattened donut.

As each curve in a 3D printed bead is made up from several linear segments this ability to change direction can be expresses as a maximum angular velocity where;

$$\text{maximum angular velocity } \omega = \frac{d\theta}{dt}$$

and where $\theta$ is the corner angle and maximum linear velocity $v = \omega r$ where $r$ is the radius of the corner FIG. 10 and FIG. 11 show a flattened donut printed with the thermoset material described in Example 3.

The object was printed using the following print parameters:
  a. Bead height: 0.675 mm
  b. Bead width: 0.75 mm
  c. Linear speed: 12 mm/s
  d. Flowrate: 6.075 mm³/s
  e. Fill pattern: Concentric
  f. Corner speed: 72 degrees per second Given a corner speed of 72 degrees per second and a radius of 20 mm the linear speed would be 12 mm/s.

Optimizing the geometry, resolution and print speed in concert with the thermoset flow-rate can be key to creation of an accurate 3D representation of a 3D model.

What is claimed is:

1. A three-dimensional (3D) object production method comprising:
  providing an extruded thermoset printing apparatus comprising:
    an extrusion nozzle to deliver a thermosetting material to form a 3D object, and
    a mixing chamber to receive and mix at least a first reactive component and a second reactive component to provide the thermosetting material;
  detecting an obstruction within the extruded thermoset printing apparatus;
  removing the obstruction within the extruded thermoset printing apparatus; and
  producing the 3D object based on a 3D object design using thermosetting material delivered by the extruded thermoset printing apparatus,
  wherein the removing comprises purging the extrusion nozzle.

2. The method according to claim 1, wherein detecting an obstruction within the extruded thermoset printing apparatus comprises analyzing one or more properties of the extruded thermoset printing apparatus to detect the obstruction.

3. The method according to claim 2, wherein the extruded thermoset printing apparatus comprises one or more pumps to at least deliver each of the first reactive component and a second reactive component to the mixing chamber, wherein the one or more properties of the extruded thermoset printing apparatus comprises torque of the one or more pumps.

4. The method according to claim 1, wherein the extruded thermoset printing apparatus comprises one or more flow meters to determine one or more of:
  a first flow rate of the first reactive component to the mixing chamber,
  a second flow rate of the second reactive component to the mixing chamber, and
  an extrusion flow rate of the thermosetting material from the extrusion nozzle, wherein the one or more properties of the extruded thermoset printing apparatus comprises one or more of the first flow rate, the second flow rate, and the extrusion flow rate.

5. The method according to claim 1, wherein the extruded thermoset printing apparatus comprises one or more pressure sensors to determine one or more of:
  a mixing chamber pressure within the mixing chamber, and
  an extrusion pressure within the extrusion nozzle, wherein the one or more properties of the extruded thermoset printing apparatus comprises one or more of the mixing chamber pressure and the extrusion pressure.

6. The method according to claim 1, wherein the method comprises:

initiating a cleaning event in response to detection of an obstruction within the extruded thermoset printing apparatus.

7. A three-dimensional (3D) object production method comprising:
providing an extruded thermoset printing apparatus comprising:
an extrusion nozzle to deliver a thermosetting material to form a 3D object, and
a mixing chamber to receive and mix at least a first reactive component and a second reactive component to provide the thermosetting material;
producing the 3D object based on a 3D object design using thermosetting material delivered by the extruded thermoset printing apparatus; and
detecting one or more mixing properties based on the thermosetting material as the thermosetting material is delivered by the extruded thermoset printing apparatus, wherein the extruded thermoset printing apparatus comprises
a color detector to detect a color of the thermosetting material as the thermosetting material is delivered by the extruded thermoset printing apparatus, wherein the one or more mixing properties comprises color detected by the color detector or
a chemical property detector to detect one or more chemical properties of the thermosetting material as the thermosetting material is delivered by the extruded thermoset printing apparatus, wherein the one or more mixing properties comprises the one or more chemical properties detected by the chemical property detector.

8. The method according to claim 7, wherein the extruded thermoset printing apparatus comprises the color detector to detect a color of the thermosetting material as the thermosetting material is delivered by the extruded thermoset printing apparatus, wherein the one or more mixing properties comprises color detected by the color detector.

9. The method according to claim 8, wherein the color detector comprises one or more of a photodetector, a photoresistor, a photodiode, and a phototransistor.

10. The method according to claim 7, wherein the extruded thermoset printing apparatus comprises the chemical property detector to detect one or more chemical properties of the thermosetting material as the thermosetting material is delivered by the extruded thermoset printing apparatus, wherein the one or more mixing properties comprises the one or more chemical properties detected by the chemical property detector.

11. The method according to claim 10, wherein the one or more chemical properties comprise at least one of urethane content, urea content, isocyanate content, and aromatic content.

12. The method according to claim 7, wherein the method comprises:
determining whether quality of the thermosetting material is acceptable based on the detected one or more mixing properties; and
initiating a quality control event in response to determination that quality of the thermoset product is not acceptable.

13. The method according to claim 12, wherein the quality control event comprises one or more of a quality control notification to notify the user of the unacceptability of the thermosetting material and a delay process to allow for the quality of thermosetting material to improve.

14. The method according to claim 12, wherein the quality control event comprises a purge process to purge the unacceptable thermosetting material.

15. A three-dimensional (3D) object production method comprising:
providing an extruded thermoset printing apparatus comprising:
an extrusion nozzle to deliver a thermosetting material to form a 3D object, and
a mixing chamber to receive and mix at least a first reactive component and a second reactive component to provide the thermosetting material;
detecting an obstruction within the extruded thermoset printing apparatus;
removing the obstruction within the extruded thermoset printing apparatus; and
producing the 3D object based on a 3D object design using thermosetting material delivered by the extruded thermoset printing apparatus,
wherein the removing comprises wiping the extrusion nozzle.

16. The method according to claim 15, wherein detecting an obstruction within the extruded thermoset printing apparatus comprises analyzing one or more properties of the extruded thermoset printing apparatus to detect the obstruction.

17. The method according to claim 16, wherein the extruded thermoset printing apparatus comprises one or more pumps to at least deliver each of the first reactive component and a second reactive component to the mixing chamber, wherein the one or more properties of the extruded thermoset printing apparatus comprises torque of the one or more pumps.

18. The method according to claim 15, wherein the extruded thermoset printing apparatus comprises one or more flow meters to determine one or more of:
a first flow rate of the first reactive component to the mixing chamber,
a second flow rate of the second reactive component to the mixing chamber, and
an extrusion flow rate of the thermosetting material from the extrusion nozzle, wherein the one or more properties of the extruded thermoset printing apparatus comprises one or more of the first flow rate, the second flow rate, and the extrusion flow rate.

19. The method according to claim 15, wherein the extruded thermoset printing apparatus comprises one or more pressure sensors to determine one or more of:
a mixing chamber pressure within the mixing chamber, and
an extrusion pressure within the extrusion nozzle, wherein the one or more properties of the extruded thermoset printing apparatus comprises one or more of the mixing chamber pressure and the extrusion pressure.

20. The method according to claim 15, wherein the method comprises:
initiating a cleaning event in response to detection of an obstruction within the extruded thermoset printing apparatus.

* * * * *